United States Patent [19]

Glorioso et al.

[11] Patent Number: 5,095,042
[45] Date of Patent: Mar. 10, 1992

[54] METHOD FOR MAKING RIGID POLYISOCYANURATE FOAM

[75] Inventors: Sammie J. Glorioso, Brandon; John Broom, Jackson, both of Miss.

[73] Assignee: Apache Building Products Company, Jackson, Miss.

[21] Appl. No.: 749,170

[22] Filed: Aug. 23, 1991

[51] Int. Cl.$^5$ .............................................. C08J 9/00
[52] U.S. Cl. .................................... 521/125; 521/902
[58] Field of Search ................................ 521/125, 902

[56] References Cited

U.S. PATENT DOCUMENTS

| | | | |
|---|---|---|---|
| 4,401,769 | 8/1983 | Malawitz | 521/113 |
| 4,425,446 | 1/1984 | Malawitz | 521/108 |
| 4,559,370 | 12/1985 | Blampied | 521/125 |
| 4,565,833 | 1/1986 | Buszard | 524/130 |
| 4,656,200 | 4/1987 | Clubley et al. | 521/108 |
| 4,666,967 | 5/1987 | Richardson | 524/131 |
| 4,880,848 | 11/1989 | Ghali | 521/125 |

*Primary Examiner*—Morton Foelak
*Attorney, Agent, or Firm*—Dickinson, Wright, Moon, Van Dusen & Freeman

[57] ABSTRACT

A rigid polyisocyanurate foam suitable for holding stems of artificial flowers is a substantially closed cell foam having a density of about 1.7 to 2.9 lb./cu. ft. The foam is made by mixing components A and B in a ratio of B:A of about 0.2 to 0.6. Component B is a mixture of 100 parts by weight of polyester or polyether polyol, 0.5 to 5 parts by weight of potassium octoate, 4 to 10 parts by weight of water and 0 to 8 parts by weight of green colorant. Component B is mixed with 250 to 500 parts by weight of polymeric diphenyl methane diisocyanate (component A), and the resulting mixture is poured onto a substrate, which may be a conveyor or a mold box, for foaming in a substantially free rise step with a cream time of about 5 to 20 seconds. The conveyor is preferably heated to about 100° to 150° F. The foam is cured before cutting.

16 Claims, 1 Drawing Sheet

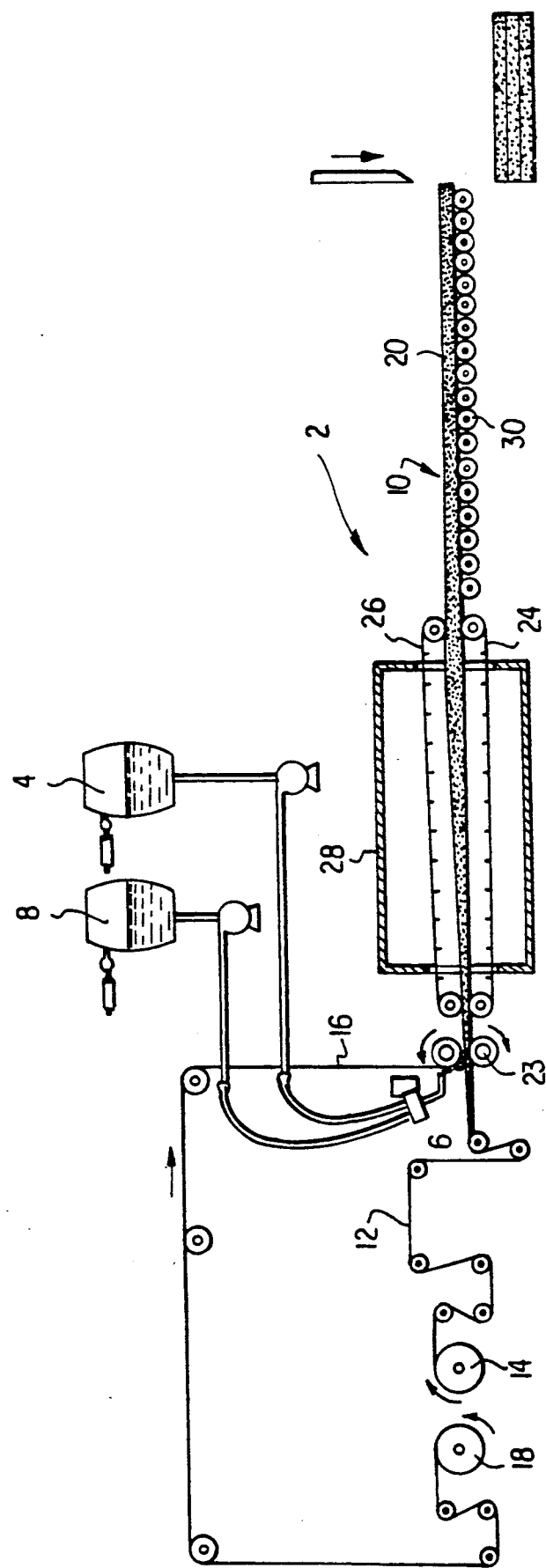

METHOD FOR MAKING RIGID POLYISOCYANURATE FOAM

FIELD OF THE INVENTION

The invention relates to methods for making closed cell rigid polyisocyanurate foam, suitable for artificial flower arrangements, etc.

BACKGROUND OF THE INVENTION

Polyisocyanurate foams are well known. Such foams, when used for floral foam, must be able to hold the flower stems firmly. If the foam recovery is too great and the foam is too flexible, the stems are not held but are pushed out of the foam support. Jabs, et al., U.S. Pat. No. 3,873,476, describes a hydrophilic polyurethane foam which is suitable for use as a substrate for cut flowers. The diisocyanate is partly biuretized by reacting the diisocyanates with water, before mixing with a polyester polyol.

Smith, U.S. Pat. No. 4,525,490, describes a flexible open cell polyurethane foam composition. Hopkins, U.S. Pat. No. 4,036,792, describes polyisocyanurate foams prepared using a cocatalyst system. Polyisocyanurate foams are also described in Moss et al. U.S. Pat. No. 4,169,921, Skowronski, et al., U.S. Pat. No. 4,311,801, Bernard et al., U.S. Pat. No. 4,405,725, Ashida et al., U.S. Pat. No. 4,514,525, Tideswell et al., 4,544,679, Soukup, et al., U.S. Pat. No. 4,710,521 and Okina, U.S. Pat. No. 4,952,358.

Wells, U.S. Pat. No. 3,993,608 describes poly (ure-thaneisocyanurate) foams containing hollow glass spheres. Rigid isocyanurate polyurethane foams and methods for preparing these foams are also described in Biranowski, et al., U.S. Pat. No. 4,271,273. Ohashi et al., U.S. Pat. No. 4,189,541 describes a method for producing heat resistant and flame resistant polyisocyanurate foams using little or no organosilicone surfactant. Likewise, Austin, et al., U.S. Pat. No. 4,067,833, also describes urethane modified polyisocyanurate foams.

SUMMARY OF THE INVENTION

A rigid polyisocyanurate foam suitable for holding stems of artificial flowers is a substantially closed cell foam having a density of about 1.7 to 2.9 lb./cu. ft. The foam is made by mixing components A and B in a ratio of B:A of about 0.2 to 0.6. Component B is a mixture of 100 parts by weight of polyester or polyether polyol, 0.5 to 5 parts by weight of potassium octoate, 4 to 10 parts by weight of water and 0 to 8 parts by weight of green colorant. Component B is mixed with about 180 to 600 parts by weight of polymeric diphenyl methane diisocyanate (component A), preferably with about 250 to 500 parts by weight of component A, and the resulting mixture is poured onto a substrate, which may be a conveyor or a mold box, for foaming in a substantially free rise step with a cream time of about 5 to 50 seconds. The conveyor is preferably heated to about 100° to 150° F. The foam is cured at room temperature before cutting.

Water acts as the blowing agent by reacting exothermically with the isocyanate to form steam which acts as a blowing agent and/or to produce a urea product and carbon dioxide, which is also an effective blowing agent for forming the foam.

BRIEF DESCRIPTION OF THE DRAWING

FIG. 1 is a schematic view of apparatus used for practicing the process of the invention for making foam.

DETAILED DESCRIPTION OF THE INVENTION

A closed cell, rigid polyisocyanurate foam of the invention, suitable for holding artificial flowers, is not described in the prior art. The foam is a substantially closed cell foam. The formulation of the invention is simple, without fillers.

Materials suitable for use for production of isocyanurate foams are described, for example, in Gluck, U.S. Pat. No. 4,795,763, the disclosure of which is incorporated herein by reference. The alternative ingredients for the mixture described in U.S. Pat. No. 4,795,763 may be used in the subject process according to the parameters of the ratio of B:A used herein in the process of the invention.

The rigid isocyanurate foam of the invention is a water blown foam typically made by blending together a "B" component, namely a mixture of 100 parts by weight of polyether or polyester polyol, 0.5 to 5 parts by weight of potassium octoate, 4 to 10 parts by weight of water and 0 to 8 parts by weight of green colorant, with an "A" component which is about 180 to 600 parts by weight of polymeric diphenyl methane diisocyanate, and preferably about 250 to 500 parts by weight of polymeric diphenyl methane diisocyanate. The ratio of B:A is about 0.2 to 0.6, preferably about 0.23 to 0.5 and more preferably about 0.3 to 0.4. Fillers are not needed.

Potassium octoate is added to control the cream time and the firm time. Potassium acetate (0.5 to 3.5 parts by weight) may also be added to control the firm time during the curing stage. Other curing agents include TMR30 phenol, obtainable from Air Products and Chemicals, Inc., Allentown, PA.

The resulting mixture is poured into a form, such as an open box, allowing a free rise for producing buns. Alternatively, the mixture may be poured onto an open conveyor which allows a substantially free rise for the foam. The conveyor is lined with release paper before the mixture is poured onto the conveyor and the mixture may also be covered with release paper. In order to obtain a foam product of substantially even thickness after the mixture has foamed, the mixture on the conveyor passes under a nip roller to smooth the upper surface of the mixture before foaming. The rise may also be partially restrained by an upper conveyor which regulates the thickness of the foam. The mixture is substantially allowed to free rise enabling the cell structure to be random and disoriented. After foaming, the release paper may be peeled off or, if green floral paper is used, the paper may remain on the foam.

When made on a conveyor, the free rise of the foam may be restrained sufficiently to control the thickness of the foam product. If over-restrained during the rise, the product tends to be too flexible and releases the flower stems, disadvantageously.

The mixture to be foamed is fed from a head having a diameter of about 6 to 36 inches. The foam is preferably fed in a circular pattern onto a moving belt conveyor lined with paper. The conveyor is about 60 ft. long and is heated to a temperature of about 100° to 150° F. The foam then passes over 40 ft. of rollers, at room temperature, for curing before entering the saw room.

The conveyor and rollers move at about 30 to 80 ft./min.

The composition of the invention is a simple composition without additives or fillers and is readily made. Water reacts exothermically with the isocyanate to form steam which acts as a blowing agent to produce the foam and/or to produce a urea product and carbon dioxide. Carbon dioxide is also an effective blowing agent for forming the foam.

If the B:A ratio is less than about 0.2, the process is less cost effective and the foam produced is too friable and likely to be structurally unsound. If the B:A ratio is greater than about 0.6, the foam is too soft and flexible to hold the flower stalks satisfactorily.

EXAMPLE

The following ingredients (parts by weight) were mixed to form component B of the mixture:

| | | |
|---|---|---|
| Polyester polyol (Stepan 2852, obtainable from Stepan Co., Northfield, IL) | 100.0 | parts |
| Potassium octoate | 4.5 | parts |
| Water | 4 | parts |
| Silicone surfactant | 1 | part |
| Potassium acetate | 1 | part |
| Total: | 110.5 | parts |

Component A—340 parts of polymeric diphenyl methane diisocyanate (MDI), is mixed with component B. The ratio of B:A is 0.325.

With reference to FIG. 1, in which like numerals represent like parts, apparatus 2 is for making foam according to the Example. The mixture forming component B is injected into a run tank 4 and metered into a mixing head 6 at 5000 rpm, together with component A, which has been held in run tank 8. The resulting mixture is a liquid and is sprayed onto a paper lined moving belt conveyor 10 from mixing head 6, in a circular pattern having a diameter of about 6 to 36 inches. Conveyor 10 is lined with a layer of paper 12 fed from roll 14 and an upper layer of paper 16 is fed from roll 18. The mixture is sprayed onto paper layer 12 and then covered by paper layer 16. The upper belt 20 of the conveyor is raised to allow a substantially free rise for a throughput of foam typically about 2 inches thick. The mixture on the conveyor may optionally pass between nip rollers 22, 23 to spread the mixture before foaming takes place, to smooth the top surface of the product. The cream time of the mixture, before firming, is about 5 to 50 seconds.

Conveyor 10 is preferably a slat conveyor including a lower slat conveyor 24 and an upper slat conveyor 26 about 2 inches above the lower paper liner for the foam, to allow the foam to rise to a thickness of about 2 inches. Other appropriate arrangements will be known to those skilled in the art. Conveyor 10 is about 60 ft. in length, and is heated to about 150° F. This portion of the conveyor is substantially closed in by enclosure 28 to conserve heat. Doors (not shown) are placed about every 10 ft. along the enclosure to allow access to the equipment. The mixture foams as it passes at about 30 to 80 ft./min. along conveyor 10.

The foam having a paper liner on top and bottom then passes over a roller conveyor 30 about 30 to 80 ft. in length, preferably about 40 to 50 ft. in length, substantially at room temperature, for curing, before entering the saw room. The product is, in a non-limiting example, about 2 inches thick and is cut into sections 2 ft.×3 ft. in area, using a rotary cross-cut saw. Before cutting into sections, the edges of the foam are trimmed off using a trim saw. Surface irregularities in the foam may be sanded, off-line, with a belt sander, after curing.

Alternatively, the mixture from the mixing head is poured slowly into mold boxes where it is cured for several hours before being cut. Curing typically takes at least 6 hours or the foam is allowed to sit in the mold boxes overnight. A typical mold box may be 2 ft. long by 3 feet wide by 4 feet high.

The resulting product is an about 85–90% closed cell, rigid polyisocyanurate foam suitable for holding stems for floral arrangements of artificial flowers. The density of the foam is typically 1.7 to 2.9 lb./cu. ft. The density can be varied according to need.

Foam of the invention may be hot glued using hot resin melt glue, without disintegration of the foam, or the foam may be glued with other adhesives known in the art.

While the invention has been described above with respect to certain embodiments thereof, it will be appreciated that variations and modifications may be made without departing from the spirit and scope of the invention.

What is claimed is:

1. A process for making rigid polyisocyanurate foam comprising:
    blending together component B, comprising a mixture of 100 parts by weight of polyether or polyester polyol, 0.5 to 5 parts by weight of potassium octoate, 4 to 10 parts by weight of water and 0 to 8 parts by weight of green colorant;
    mixing component A, comprising 180 to 600 parts by weight of polymeric diphenyl methane diisocyanate with component B;
    pouring the resulting mixture onto a substrate;
    foaming the resulting mixture in a free rising step to produce a substantially rigid foam;
    wherein the ratio of B:A is about 0.2 to 0.6, and wherein the water reacts exothermically with the isocyanate to produce water and carbon dioxide which act as a blowing agent.

2. A process according to claim 1 wherein the cream time is about 5 to 50 seconds.

3. A process according to claim 2 wherein the mixture is poured into mold boxes before foaming.

4. A process according to claim 1 comprising pouring the mixture onto a conveyor before foaming.

5. A process according to claim 4 comprising pouring the mixture onto a conveyor lined with sheet material before foaming.

6. A process according to claim 5 wherein the sheet material is paper.

7. A process according to claim 5 further comprising covering the mixture with a layer of sheet material.

8. A process according to claim 7 wherein the sheet material is paper.

9. A process according to claim 4 further comprising passing the mixture on the conveyor under a nip roller for spreading the mixture before foaming.

10. A process according to claim 1 further comprising curing the foam for at least 6 hours.

11. A process according to claim 10 further comprising cutting the foam into blocks.

12. A process according to claim 1 wherein the ratio of B:A is about 0.23 to 0.5.

13. A process according to claim 1 wherein the ratio of B:A is about 0.3 to 0.4.

14. A process according to claim 1 wherein the density of the foam is about 1.7 to 2.9 lb./cu. ft.

15. A process for making rigid polyisocyanurate foam comprising:
blending together component B, comprising a mixture of 100 parts by weight of polyether or polyester polyol, 0.5 to 5 parts by weight of potassium octoate, 4 to 10 parts by weight of water and 0 to 8 parts by weight of green colorant;
mixing component A, comprising 250 to 500 parts by weight of polymeric diphenyl methane diisocyanate with component B;
pouring the resulting mixture onto a heated conveyor;
conveying the mixture for about 30 to 80 ft. on the heated conveyor during foaming;
foaming the resulting mixture in a free rising step to produce a substantially rigid foam;
conveying the mixture for about 30 to 80 ft. for curing substantially at room temperature;
wherein the ratio of B:A is about 0.2 to 0.6, and wherein the water reacts exothermically with the isocyanate to produce steam and carbon dioxide which act as a blowing agent.

16. A process for making rigid polyisocyanurate foam comprising:
blending together component B, consisting essentially of a mixture of 100 parts by weight of polyether or polyester polyol, 0.5 to 5 parts by weight of potassium octoate, 4 to 10 parts by weight of water and 0 to 8 parts by weight of green colorant;
mixing component A, consisting essentially of 250 to 500 parts by weight of polymeric diphenyl methane diisocyanate with component B;
pouring the resulting mixture onto a heated conveyor;
conveying the mixture for about 30 to 80 ft. on the heated conveyor during foaming;
foaming the resulting mixture in a free rising step to produce a substantially rigid foam;
conveying the mixture for about 30 to 80 ft. for curing substantially at room temperature;
wherein the ratio of B:A is about 0.2 to 0.6, and wherein the water reacts exothermically with the isocyanate to produce steam and carbon dioxide which act as a blowing agent;
whereby the foam firmly retains stems of artificial flowers.

* * * * *